No. 782,945. PATENTED FEB. 21, 1905.
J. E. BAKER.
FERRULE.
APPLICATION FILED JULY 11, 1904.

Witnesses
Edgworth Greene
E. Geisman

James E. Baker, Inventor
By his Attorney H. A. West

No. 782,945. Patented February 21, 1905.

UNITED STATES PATENT OFFICE.

JAMES ELLIOT BAKER, OF NEW YORK, N. Y.

FERRULE.

SPECIFICATION forming part of Letters Patent No. 782,945, dated February 21, 1905.

Application filed July 11, 1904. Serial No. 216,018.

*To all whom it may concern:*

Be it known that I, JAMES ELLIOT BAKER, a citizen of the United States, and a resident of New York, in the county of New York and State of New York, have invented certain new and useful Improvements in Ferrules, of which the following is a specification.

My invention relates to ferrules designed more particularly for use on the ends of thills and poles of vehicles; and the invention consists in the construction, arrangement, and combination of parts, all as hereinafter described, and shown in the accompanying drawings, to which reference is made and which form a part of this specification.

Figure 1:
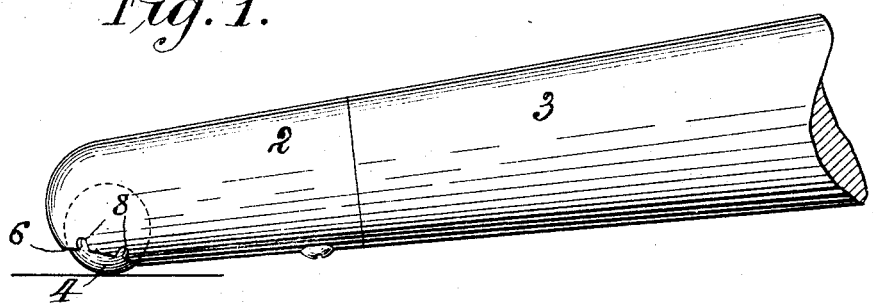
Figure 2:
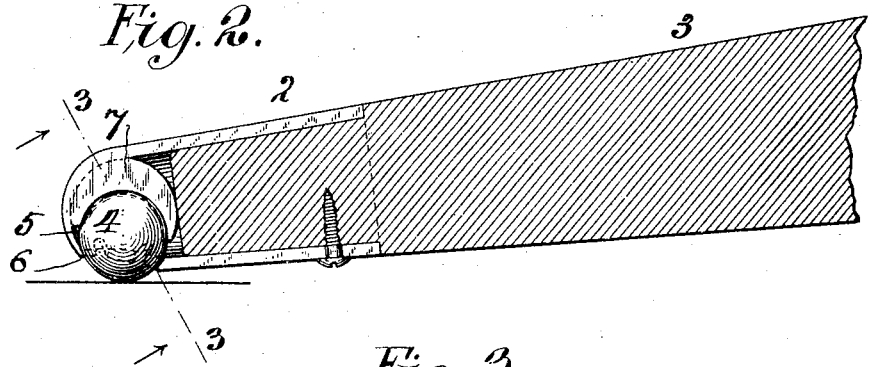
Figure 3:
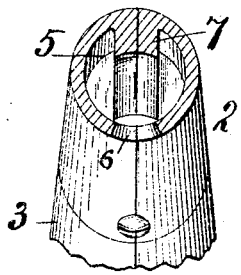
Figure 4:
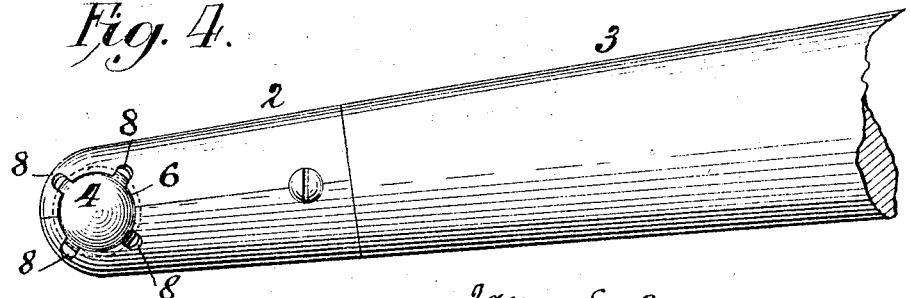

Figure 1 is a side elevation of the end of a vehicle pole or thill having my invention applied thereto. Fig. 2 is a sectional elevation of the same, illustrating the preferred method of manufacturing the ferrule. Fig. 3 is a sectional perspective view, on line 3 3 of Fig. 2, of the ferrule; and Fig. 4 is a front elevation of the ferrule and end of the pole or thill.

In the drawings, 2 designates the ferrule, and 3 the vehicle pole or thill to which the ferrule is applied. The ferrule is provided with an antifriction-ball 4, which projects at the side thereof, so as to support the thill and ferrule, as shown in Figs. 1 and 2. The ball 4 is inclosed in a cavity 5 at the front end of the ferrule and projects through an opening 6 at one side of the ferrule, as shown. As here shown, a rib 7, shaped to conform to the surface of the ball, together with the edges of the opening 6, constitute the bearing for the ball at the front of the ferrule; but I do not limit myself to any particular form of bearing, but I prefer to employ such a rib in order to reduce friction on the ball and prevent accumulation of dirt in the bearing or cavity. Should any dirt find its way into the cavity, it will be removed from the surface of the ball by the rib 7 and will find its escape through one or more openings 8.

In making the ferrule I prefer to make it in two parts and after trimming the bearing to put the ball in place and solder or braze the two parts together.

Having thus described my invention, what I claim as new, and desire to secure by Letters Patent, is—

1. A ferrule formed with a cavity at the front end thereof, an opening in the side of the ferrule and an antifriction-ball held in said cavity and projecting through said opening, substantially as described.

2. A ferrule formed with a cavity at the front end thereof, a bearing formed in said cavity, an opening in the side of said ferrule and an antifriction-ball held in said cavity and projecting through said side opening, substantially as described.

3. A ferrule formed with a cavity in the front thereof, a bearing-rib formed in said cavity, a side opening formed in the ferrule and an antifriction-ball held by said opening and rib, substantially as described.

4. A ferrule formed with a cavity at the front end thereof, a bearing-rib formed in said cavity, a side opening formed in the ferrule, one or more recesses in the bottom of the cavity and an antifriction-ball held in said cavity, substantially as described.

JAMES ELLIOT BAKER.

Witnesses:
H. ALBERTUS WEST,
E. GEISMAR.